US009858618B2

(12) United States Patent
Heaton (10) Patent No.: US 9,858,618 B2
(45) Date of Patent: *Jan. 2, 2018

(54) GRAPHICAL USER INTERFACE RELATED TO NON-STANDARD TRADING OF FINANCIAL INSTRUMENTS

(71) Applicant: BGC PARTNERS, INC., New York, NY (US)

(72) Inventor: Timothy H. Heaton, Morristown, NJ (US)

(73) Assignee: BGC PARTNERS, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/964,235

(22) Filed: Aug. 12, 2013

(65) Prior Publication Data

US 2014/0052600 A1 Feb. 20, 2014

Related U.S. Application Data

(63) Continuation of application No. 13/290,300, filed on Nov. 7, 2011, now Pat. No. 8,510,192, which is a continuation of application No. 12/901,628, filed on Oct. 11, 2010, now Pat. No. 8,060,427, which is a continuation of application No. 10/661,763, filed on Sep. 11, 2003, now Pat. No. 7,813,977.

(51) Int. Cl.
*G06Q 40/04* (2012.01)
*G06Q 40/00* (2012.01)
*G06Q 40/06* (2012.01)

(52) U.S. Cl.
CPC ............ *G06Q 40/04* (2013.01); *G06Q 40/00* (2013.01); *G06Q 40/06* (2013.01)

(58) Field of Classification Search
CPC ........ G06Q 40/04; G06Q 40/06; G06Q 40/08; G06Q 40/00; G06Q 40/12; G06Q 40/02; G06Q 40/025
See application file for complete search history.

(56) References Cited

U.S. PATENT DOCUMENTS 6,016,482 A 1/2000 Molinari et al.
6,134,535 A 10/2000 Belzberg
(Continued)

FOREIGN PATENT DOCUMENTS

CA 2381782 * 8/2000 ............ G06F 17/60
EP 1 049 037 11/2000
(Continued)

OTHER PUBLICATIONS

Prof Carpenter: The Ripo Market, Oct. 1, 2002, New York University Stern Schoiol of Business, pp. 1-11.*
(Continued)

*Primary Examiner* — Bijendra K Shrestha (57) ABSTRACT

A graphical user interface related to non-standard settlement trading in financial instruments is provided. The graphical user interface preferably includes a selectable portion of a display screen related to a financial instrument and a selectable tab for accessing a selectable portion of the display screen related to one or a plurality of non-standard settlement positions with respect to the financial instrument. In one embodiment of the invention, when the tab is selected, access is provided to the selectable portion of the display screen related to the plurality of non-standard settlement positions.

12 Claims, 6 Drawing Sheets

(56) References Cited

U.S. PATENT DOCUMENTS

| | | | |
|---|---|---|---|
| 6,304,858 B1 | 10/2001 | Mosler et al. | |
| 6,343,278 B1* | 1/2002 | Jain | G06Q 40/06 705/36 R |
| 6,996,540 B1* | 2/2006 | May | G06Q 30/08 705/35 |
| 7,124,108 B1* | 10/2006 | Kimle | G06Q 10/10 705/35 |
| 7,200,572 B2* | 4/2007 | Beurskens | G06Q 30/0206 705/35 |
| 7,313,539 B1* | 12/2007 | Pappas | G06Q 10/00 360/27 |
| 7,813,977 B2 | 10/2010 | Heaton | |
| 8,060,427 B2 | 11/2011 | Heaton | |
| 8,510,192 B2 | 8/2013 | Heaton | |
| 2001/0034687 A1 | 10/2001 | Bushonville et al. | |
| 2001/0037284 A1* | 11/2001 | Finkelstein | G06Q 40/04 705/37 |
| 2001/0038284 A1 | 11/2001 | Hahn | |
| 2002/0029180 A1 | 3/2002 | Kirwin et al. | |
| 2002/0073021 A1 | 6/2002 | Ginsberg et al. | |
| 2002/0091625 A1 | 7/2002 | Blauvelt et al. | |
| 2002/0120546 A1 | 8/2002 | Zajac | |
| 2002/0174043 A1 | 11/2002 | Gilbert et al. | |
| 2002/0178104 A1* | 11/2002 | Hausman | G06Q 40/04 705/37 |
| 2003/0004862 A1 | 1/2003 | Lutnick et al. | |
| 2003/0074300 A1 | 4/2003 | Norris | |
| 2003/0154152 A1 | 8/2003 | Gilbert et al. | |
| 2004/0030638 A1 | 2/2004 | Dwin | |
| 2004/0133494 A1 | 7/2004 | Jones et al. | |
| 2004/0158519 A1 | 8/2004 | Lutnick et al. | |
| 2004/0199459 A1* | 10/2004 | Johnston | G06Q 40/00 705/38 |
| 2004/0249742 A1* | 12/2004 | Laurent | G06Q 10/02 705/37 |
| 2004/0267657 A1 | 12/2004 | Hecht | |
| 2005/0044026 A1 | 2/2005 | Leistner | |
| 2006/0080216 A1* | 4/2006 | Hausman | G06Q 40/04 705/37 |
| 2006/0218069 A1 | 9/2006 | Aberman et al. | |

FOREIGN PATENT DOCUMENTS

| | | |
|---|---|---|
| WO | WO 02/075489 | 3/2002 |
| WO | WO 02/073350 | 9/2002 |

OTHER PUBLICATIONS

Barclays Capital: Repo Securities Lending: Product Guide, 2002, pp. 1-28.*
DeJean, David: Revealing the hidden secret of "hidden-when", Sep. 1, 2000, DeveloperWorks, IBM, pp. 1-16.*
Murphy, Niall: Usability for Graphical User Interfaces, Feb. 26, 2001, Internet Appliance Design, pp. 1-9.*
USPTO Office Action for U.S. Appl. No. 10/661,763, dated Jan. 10, 2008 (9 pages).
USPTO Petition Decision for U.S. Appl. No. 10/661,763, dated Jul. 10, 2008 (1 page).
USPTO Office Action for U.S. Appl. No. 10/661,763, dated Oct. 29, 2008 (15 pages).
USPTO Pre-Brief Conference Request for U.S. Appl. No. 10/661,763, dated Apr. 29, 2009 (5 pages).
USPTO Pre-Brief Appeal Conference Decision for U.S. Appl. No. 10/661,763, dated Jun. 23, 2009 (2 pages).
USPTO Office Action for U.S. Appl. No. 10/661,763, dated Sep. 1, 2009 (18 pages).
USPTO Notice of Allowance and Fees Due for U.S. Appl. No. 10/661,763, dated Aug. 5, 2010 (7 pages).
USPTO Examiner Interview Summary Record for U.S. Appl. No. 10/661,763, dated Aug. 17, 2010 (2 pages).
Stephen A. Lumpkin, Repurchase and Reverse Repurchase Agreements, Federal Reserve Bank of Richmond, Economic Review, Jan./Feb. 1987, pp. 15-23.
Marida Bertocchi et al., Bond Portfolio Management With Repo Contracts: The Italian Case, Annals of Operations Research 97 (2000), pp. 111-129.
Alex Shapiro, Foundations of Finance: Forwards and Futures, Lecture Notes 16, Fall 1993, pp. 1-15.
USPTO Office Action for U.S. Appl. No. 12/901,628, dated Nov. 24, 2010 (9 pages).
USPTO Notice of Allowance and Fees Due for U.S. Appl. No. 12/901,628, dated Jul. 1, 2011 (9 pages).
Lumpkin, S; Repurchase and Reverse Repurchase Agreements, Ferderal Reserve Bank of Richmond, Economic Review, Jan./Feb. 1987, pp. 15-23.
Bertocchi et al.: Bond portfolio management with repo contracts: Italian case, 2000, Annals of Operations Research 97 (2000) pp. 111-129.
Canadian Exam Report for Application No. 2,481,147, dated Mar. 26, 2012, 4 pages.
Canadian Exam Report for Application No. 2,481,147, dated Sep. 30, 2013, 4 pages.
USPTO Office Action for U.S. Appl. No. 13/290,300, dated Dec. 9, 2011, (10 pages).
USPTO Office Action for U.S. Appl. No. 13/290,300, dated Aug. 16, 2012 (6 pages).
USPTO Notice of Allowance and Fees Due for U.S. Appl. No. 13/290,300, dated Apr. 23, 2013 (10 pages).
Canadian Exam Report for Application No. 2,481,147, dated Mar. 22, 2017, 8 pages.
Canadian Exam Report for Application No. 2,481,147, dated Jan. 14, 2015, 8 pages.
Canadian Exam Report for Application No. 2,481,147, dated Mar. 11, 2016, 7 pages.

* cited by examiner

| Instrument and Settlement Date | Price/Volume | |
|---|---|---|
| usg_10Y (United States Government 10-Year Bond) | | |
| Settle in the cash (Cash Market) | 97.10/97.10+ | 5x7 |
| Settle at r+1 | 97.102/97.106 | 5x7 |
| Settle at r+2 | 97.096/97.102 | 5x7 |
| Settle at r+3 | 97.09+/97.10 | 5x7 |
| Settle at r+4 | 97.092/97.096 | 5x7 |
| Settle at r+5 | 97.09/97.09+ | 5x7 |
| Settle at r+6 | 97.086/97.092 | 5x7 |
| Settle at 30 | 97.08+/97.09 | 5x7 |
| Settle at 60 | 97.082/97.086 | 5x7 |
| Settle at 90 | 97.08/97.08+ | 5x7 |
| | 97.078/97.082 | 5x7 |

FIG. 4

| Instrument and Settlement Date | Price/Volume | |
|---|---|---|
| usg_10Y (United States Government 10-Year Bond) | 97.10/97.10+ | 5x7 |
| Settle in the cash (Cash Market) | 97.102/97.106 | 5x7 |

510

"CLICK TO DROP"

| Instrument and Settlement Date | Price/Volume | |
|---|---|---|
| usg_10Y (United States Government 10-Year Bond) | 97.10/97.10+ | 5x7 |
| Settle in the cash (Cash Market) | 97.102/97.106 | 5x7 |
| Settle at r+1 | 97.096/97.102 | 5x7 |
| Settle at r+2 | 97.09+/97.10 | 5x7 |
| Settle at r+3 | 97.092/97.096 | 5x7 |
| Settle at r+4 | 97.09/97.09+ | 5x7 |
| Settle at r+5 | 97.086/97.092 | 5x7 |
| Settle at r+6 | 97.08+/97.09 | 5x7 |
| Settle at 30 | 97.082/97.086 | 5x7 |
| Settle at 60 | 97.08/97.08+ | 5x7 |
| Settle at 90 | 97.078/97.082 | 5x7 |

GRAPHICAL USER INTERFACE RELATED TO NON-STANDARD TRADING OF FINANCIAL INSTRUMENTS

CROSS REFERENCE TO RELATED APPLICATIONS

This application is a continuation of U.S. application Ser. No. 13/290,300, (now U.S. Pat. No. 8,510,192), filed Nov. 7, 2011, entitled "GRAPHICAL USER INTERFACE RELATED TO NON-STANDARD TRADING OF FINANCIAL INSTRUMENTS", by Timothy H. Heaton, which is a continuation of U.S. patent application Ser. No. 12/901,628 (now U.S. Pat. No. 8,060,427), filed on Oct. 11, 2010, entitled "GRAPHICAL USER INTERFACE RELATED TO NON-STANDARD TRADING OF FINANCIAL INSTRUMENTS," by Timothy H. Heaton, which is a continuation of U.S. patent application Ser. No. 10/661,763 (now U.S. Pat. No. 7,813,977), filed on Sep. 11, 2003, entitled "GRAPHICAL USER INTERFACE RELATED TO NON-STANDARD TRADING OF FINANCIAL INSTRUMENTS," by Timothy H. Heaton, each of which is hereby incorporated by reference herein in its entirety.

BACKGROUND OF THE INVENTION

This invention relates to the trading of securities. More particularly, this invention relates to trading financial instruments for non-standard settlement. Such non-standard settlement (for United States Treasuries, the standard settlement is next day) may be immediate—i.e., in the cash market for immediate settlement—or forward settlement—i.e., further into the future than the next day.

One type of such a non-standard settlement is forward contract. A forward contract for a purchase or sale greater than one day into the future is a transaction in which a seller agrees to deliver a specific commodity or instrument to a buyer at some non-standard time in the future. Unlike futures contracts (which may occur through a clearing firm), forward contracts are typically privately negotiated and are not standardized. Consequently, the two parties to the forward contract must bear each other's credit risk. This is not the case with a futures contract. Also, because the contracts are not exchange traded, there is no marking to market requirement, which may allow a buyer to avoid almost all capital outflow initially (though some counterparties might set collateral requirements). Given the lack of standardization in these contracts, there is generally no secondary market in forwards.

The forward price is typically adjusted such that the forward contract has no intrinsic value when the contract is written. However, if the value of the underlying commodity or instrument changes, the value of the forward contract becomes positive or negative, depending on the position held.

Forwards are priced similarly to futures contracts. Like in the case of a futures contract, the first step in pricing a forward is to add the spot price to the cost of carry. The cost of carry may include interest forgone on the underlying instrument (a positive carry), storage costs (a negative carry) or other suitable costs. The constant accruing of income associated with interest-rate related instruments is one form of carry related to engaging in a forward sale of the interest-rate related instruments. Interest-rate related instruments typically include fixed-income securities such as United States Treasury Bills, Notes, and Bonds, or variable interest-rate instruments such as inflation-based bonds.

For example, when an investor agrees to sell an interest-rate related instrument at a pre-determined time in the future—e.g., in a month's time—then the value of the interest-rate related security necessarily declines during the month because a portion of the constant accruing associated with the instrument (that forms a part of the value of the instrument at the time of the agreement to the contract) is not part of the final transaction. Therefore, a price associated with selling a forward contract for interest-rate related instrument typically decreases as the period for the forward contract increases and creates a positive carry environment.

Unlike a futures contract, however, the price of a forward contract may also include a premium for counterparty credit risk, and the fact that there is not a daily marking to market process to minimize default risk. If no allowance is made for these credit risks, then the forward price will equal the futures price.

One particular position in a forward agreement is selling in a forward contract. Selling in a forward contract, also known as a short forward position, is the agreement to sell securities, or any other suitable financial instrument, at a pre-determined time in the future. The seller may or may not own the item or items specified in the forward contract at the time of agreeing to the forward contract.

Another position in a typical forward agreement to purchase securities at a pre-determined time in the future is known as a long forward position. In a long forward position, the investor agrees to purchase one or many securities at the present price at some point in the future with the hopes of the security increasing in value before the execution of the forward contract.

As described above, in a short position, the investor agrees to sell one security or many securities at the present (or otherwise agreed upon) price, in the hopes that the security will decline in value so that the investor can purchase the security later at a lower price, thereby "covering" his short forward position. Thus, the investor can make money on a short sale if the price of the security drops subsequent to the investor initially agreeing to sell the security at the present price at some time in the future.

The manner by which an investor would sell a security short at some time in the future is to own the security at the delivery date (either by buying it or borrowing it) and then sell the borrowed security from his own account. The only caveat to this process is that the investor may be required to put up a certain amount of margin—a portion of the total amount at risk—to assure the sale. The margin requirement ensures that any short forward sale is associated with a certain amount of leverage.

In view of the foregoing, it would be desirable to provide systems and methods for providing a graphical user interface that allows a user to quickly and easily participate—e.g., buy and/or sell—in a non-standard settlement market for financial instruments.

SUMMARY OF THE INVENTION

In is an object of the invention to provide systems and methods for providing a graphical user interface that allows a user to quickly and easily participate in a non-standard settlement market for financial instruments.

In one embodiment of the invention, a graphical user interface is defined. The interface preferably includes a selectable portion of a display screen related to a financial instrument, a selectable tab for accessing a selectable portion of the display screen related to a non-standard settlement position with respect to the financial instrument. When the tab is selected, access is provided to the selectable portion of the display screen related to non-standard settlement position.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention provides apparatus and methods relating to a graphical user interface that allows a user to quickly and easily sell an interest-rate related instrument, or other suitable financial instrument, for non-standard settlement. The invention further allows a user to sell an interest-rate related security for non-standard settlement by taking advantage of liquidity in the market for a cash equivalent of the future instrument.

Figure 1:
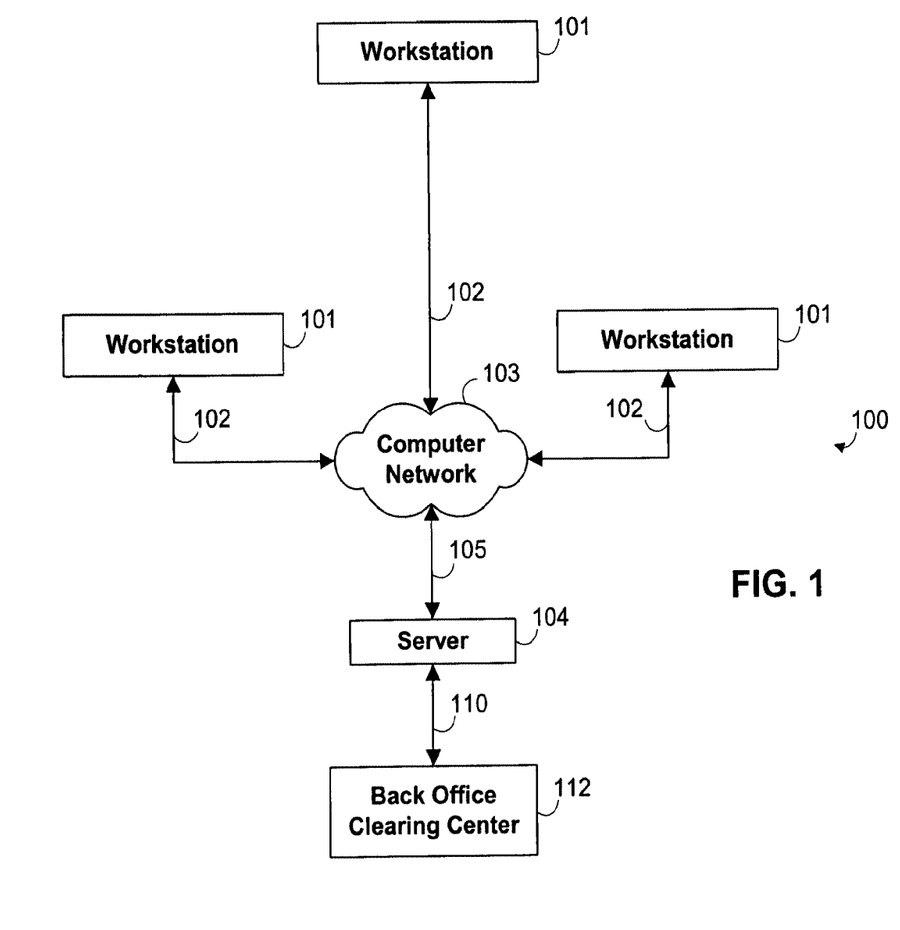
FIG. 1 is a block diagram of elements of an illustrative system in accordance with the principles of the invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, data processing device, or combination of the same. Server 104 may be used to process and settle the executed trades.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with the trades that relate to the present invention, and display a graphical user interface to users of system 100 as will be described in more detail below.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, etc.

Figure 2:
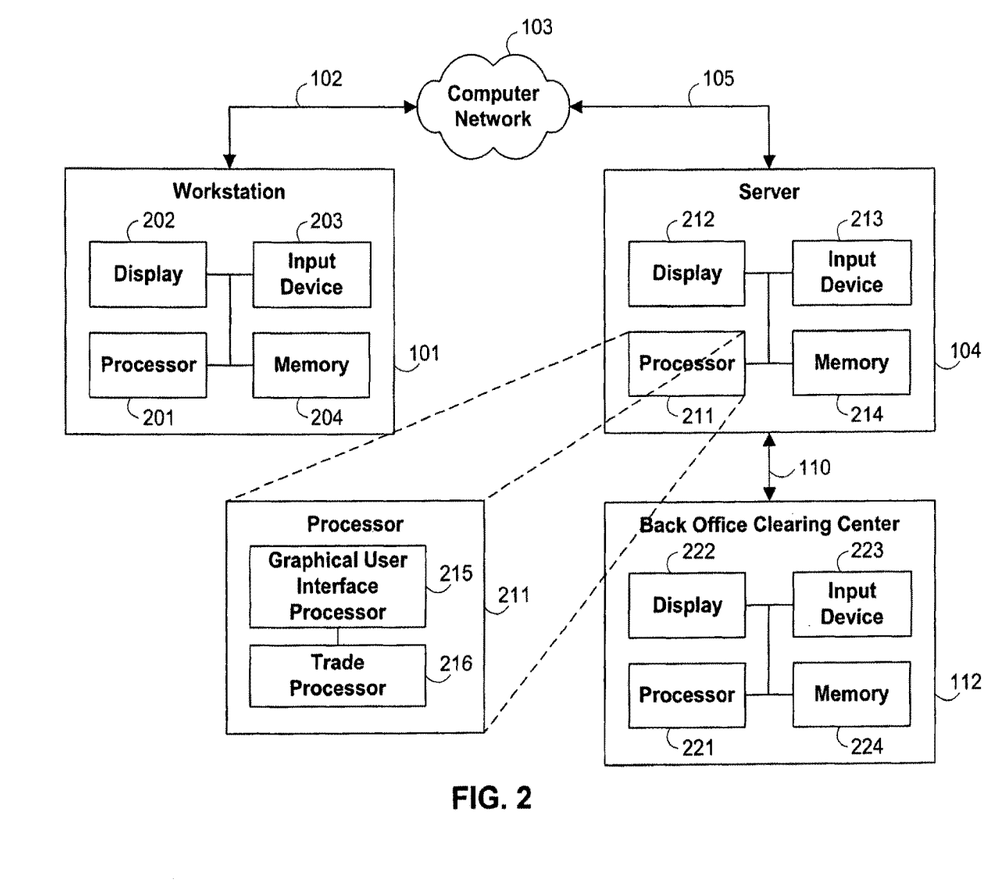
FIG. 2 is a block diagram of a workstation and a server that may be used to implement the processes and functions of certain embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 may use the workstation program to present on display 202 a graphical user interface to a user of workstation 101. Furthermore, input device 203 may be used by the user to enter bids and offers, modify them, and to enter into trades involving the interest-rate related instruments.

Server 104 may include processor 211, display 212, input device 213, and memory 214, which may be interconnected. In a preferred embodiment, memory 214 contains a storage device for storing graphical interface information as well as trade information. The storage device further contains a server program for controlling processor 211. Processor 211 uses the server program to transact the purchase and sale of the interest-rate-related instruments. Processor 211 may include graphical interface processor 215 that provides the graphical user interface based on market conditions or other criteria that may relate to the instruments. Processor 211 may include trade processor 216 that executes and processes trades.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to clear executed trades, thereby facilitating the transfer of securities resulting from the executed trades. Clearing executed trades may preferably include exchanging currency for an instrument.

Figure 3:
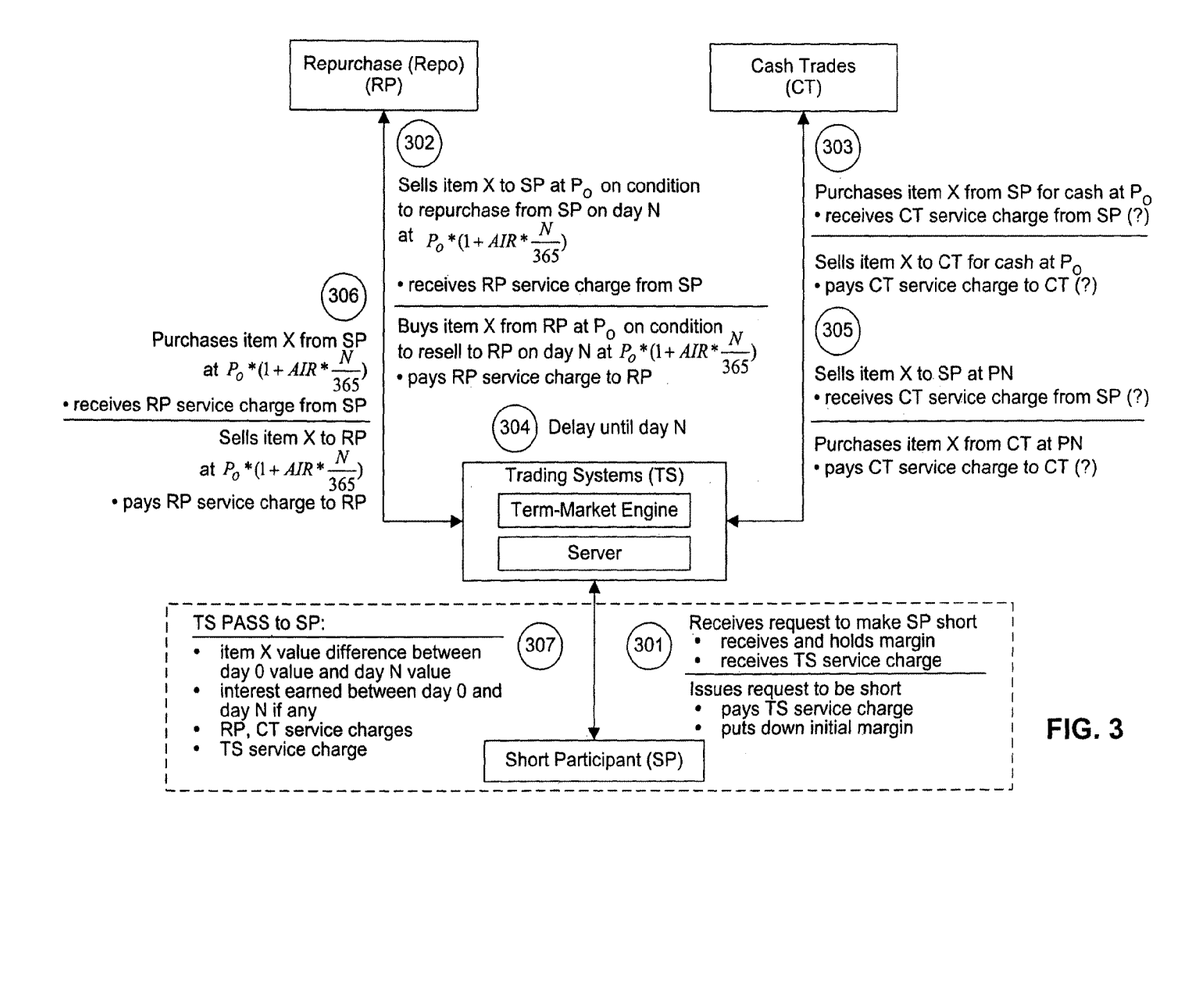
FIG. 3 is a flow chart of a method in accordance with the present invention.

FIG. 3 shows a flow diagram that illustrates a method that may be implemented on a graphical user interface according to the invention. It should be noted that the flow diagram in FIG. 3 deals specifically with a particular type of non-standard settlement—i.e., a short forward sale. Nevertheless, it should be understood that the invention is not limited by this example and, in fact, systems and methods according to the invention apply to any suitable non-standard settlement for a financial instrument.

Step 301 shows a trading system according to the invention which receives a short forward request from a short participant (SP). The request may be the result of user interaction with the interface shown in FIG. 4. In step 301, the trading system preferably receives and holds a margin associated with the short request and may receive a trading system service charge.

Step 302 shows the trading system communicating with the Repurchase (Repo) desk. To fully understand the invention, the following explanation of a Repo desk (at least with respect to government securities, though the same function may still be served with respect to other instruments) is helpful. The Repo desk provides a form of short term borrowing for dealers in government securities. The dealer sells the government securities to investors, and buys the securities back at the original price (minus a service charge associated with the service provided by the Repo desk) as needed. For the party selling the security (and agreeing to repurchase it in the future), it is a repurchase agreement or "repo"; for the party on the other end of the transaction (buying the security and agreeing to sell in the future) it is a reverse repurchase agreement. It should be further noted that the Repo desk may be able to obtain the best available repo rate for the particular instrument because the repo desk is generally knowledgeable with respect to the various competitive repo rates in the market. Alternatively, the repo desk may query the market—e.g., with a request for quote—for the most aggressive bidder interested in taking part the in the non-standard settlement transaction initiated by the market participant.

With respect to the present invention, the Repo desk provides the cost information associated with the predetermined completion date of the forward contract. In this particular example, the cost information reflects the charge for obtaining and holding the instrument until the execution date of the forward contract. It is appropriate for the Repo desk to be in possession of such information because trading at the Repo desk typically reflects the cost of borrowing a particular security for a particular period of time: the required service in this embodiment of the invention.

As described above, the repo desk provides the cost associated with a forward sale of interest-rate related instrument X at Price ($P_1$) on day N. The cost is generally the traded cash price ($P_0$) of the instrument on day 0 less the price of $$P_0 * \left(1 + AIR * \frac{N}{365}\right)$$

where AIR is the Annual Interest Rate for the particular interest-rate related instrument being used in the non-standard settlement. Thus, the carry cost will be a negative number, representing a positive carry—i.e., the one who carries the item is making, not losing, money—which indicates that $P_0$ is incrementally higher than $P_1$ because of the interest that has been foregone for the time owned by the investor, plus a suitable repurchase charge.

In step 303, in addition to providing cost information, as shown in step 302, the Repo desk also may sell (or hold in escrow) item X to SP at $P_0$ on condition to repurchase from SP on day N at $$P_0 * \left(1 + AIR * \frac{N}{365}\right).$$

The TS purchases item X at $P_0$ from the Repo desk for resale at a later date. Thus, the Repo desk takes a long position in item X for the pendency of the contract. Thereafter, the TS sells item X substantially immediately in the cash market.

Step 304 shows a suitable delay until day N at which the short forward position is covered. The covering of the short position is shown in steps 305-307.

Step 305 shows the trading system, on behalf of the short participant, buying on day N the instrument X in the cash market. An additional suitable cash trades (CT) service charge may be charged to the short forward participant. To close out the position of the short forward participant, the short forward participant will be required to return the purchased item X to the Repo desk or extend—i.e., roll over—his obligation to the Repo desk. Either of these actions may preferably be carried out on his behalf by the trading system.

Thereafter, step 306 shows the trading system passing to the short participant the item X value difference between day 0 and day N reduced by the amount of interest earned (and the concomitant reduction in value of the instrument) between day 0 and day N, if any; and reduced by the repo desk service charge, the cash trade service charge and the trading system service charge.

In the example shown in FIG. 3 the position described is a short forward position, but systems and methods according to the invention apply to both a short and a long forward position, as well as to any other suitable non-standard instrument—as will be further evident from the following. It should be noted as well that one important aspect of the invention is that systems and methods according to the invention preferably utilize tradable components—i.e., components related to standard instruments, to form a contract related to forwards or other non-standard settlements instruments. In an alternative embodiment of the invention, a Repo desk trader may be able to utilize any liquidity provided on such a system of non-standard settlement to participate in trades as the particular needs of his desk or associated positions dictate.

Figure 4:
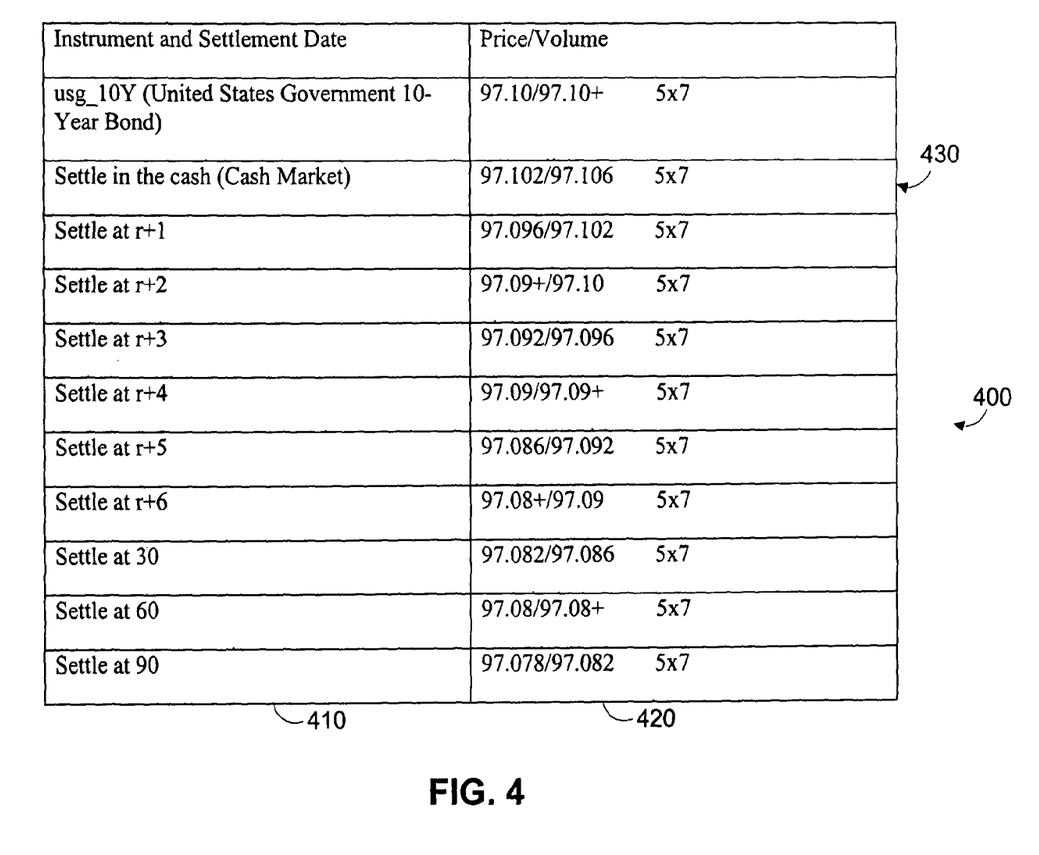
FIG. 4 is a graphical user interface according to the invention.

The process of providing the opportunity to establish a non-standard forward position is enhanced by the graphical user interface 400 (GUI) shown in FIG. 4. GUI 400 preferably includes at least two columns 410 and 420. Column 410 shows the instrument that is being offered to the forward participant and the various settlement dates at which the forward participant may choose to settle his forward position. The dates range from one day in the future to 90 days in the future at varying increments. Any suitable date may be implemented in the GUI.

Column 420 shows the various prices for the various dates. The prices are based on the cash price at the top of column 420 and may be extrapolated off of the cash price based on the length of the forward contract, the annual interest rate and current market conditions (typically obtained from the Repo desk). Alternatively, one of the forward positions may reflect actual market conditions and the cash price and the other short positions may be extrapolated from the market conditions for the one short position. Thus, at least in one embodiment of the invention, the prices for the various forward contracts may take advantage of the liquidity of trading of instruments at the cash price.

It should be noted that where only one of a bid or offer is shown in the underlying market, then any extrapolated market will also preferably only be able to show a bid or an offer.

Figure 5:
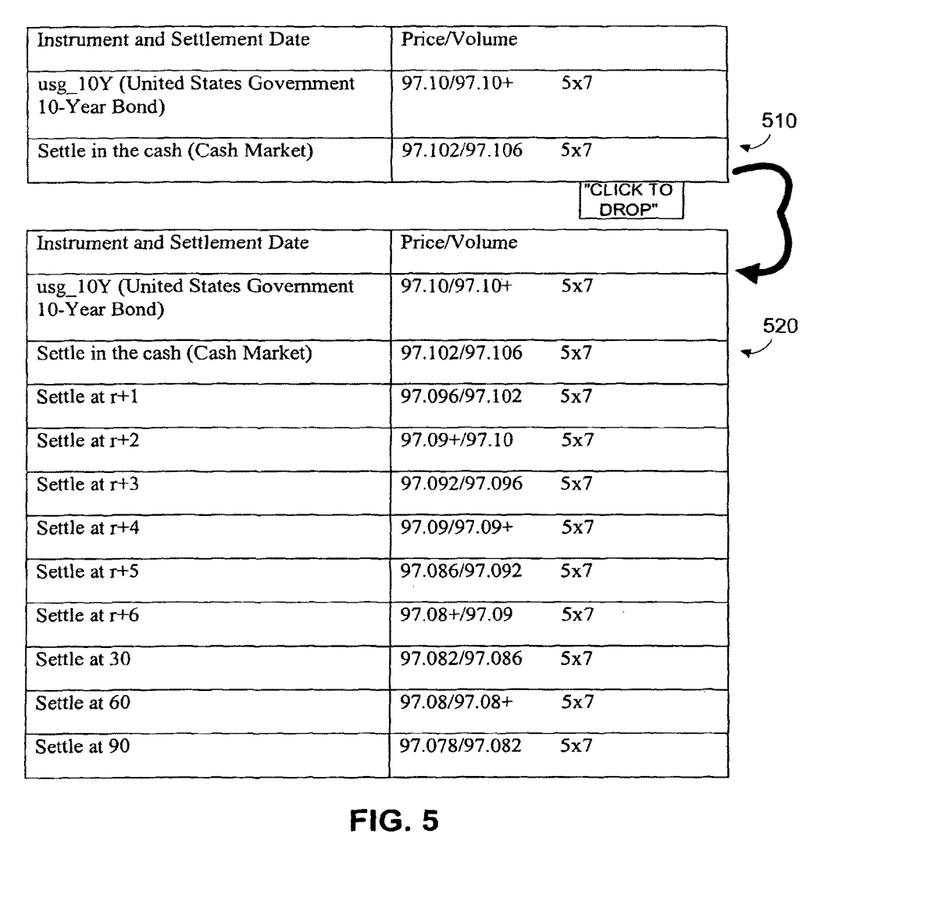
FIG. 5 is another graphical user interface according to the invention.

In a preferred embodiment of the invention shown in FIG. 5, the currently traded price 510 may be shown at the top of a screen and then, in response to some input signal—e.g., a click from a mouse—the top of the screen may be expanded to the drop-down menu 520 shown in FIG. 5 (which is the same as the screen shown in FIG. 4). In this way, a minimum of area may be displayed on the screen and the larger portion of the menu adapted for trading the forward contracts may be hidden, yet easily accessible. In one embodiment according to the invention, a tab may be attached at the bottom of the traded price 510. The tab may be used to access the list of forward contracts available to an investor. Though drop-down menu 520 shows a plurality of non-standard settlement positions, it should be noted that the invention describes a drop-down menu with even a single non-standard settlement position.

Figure 6:
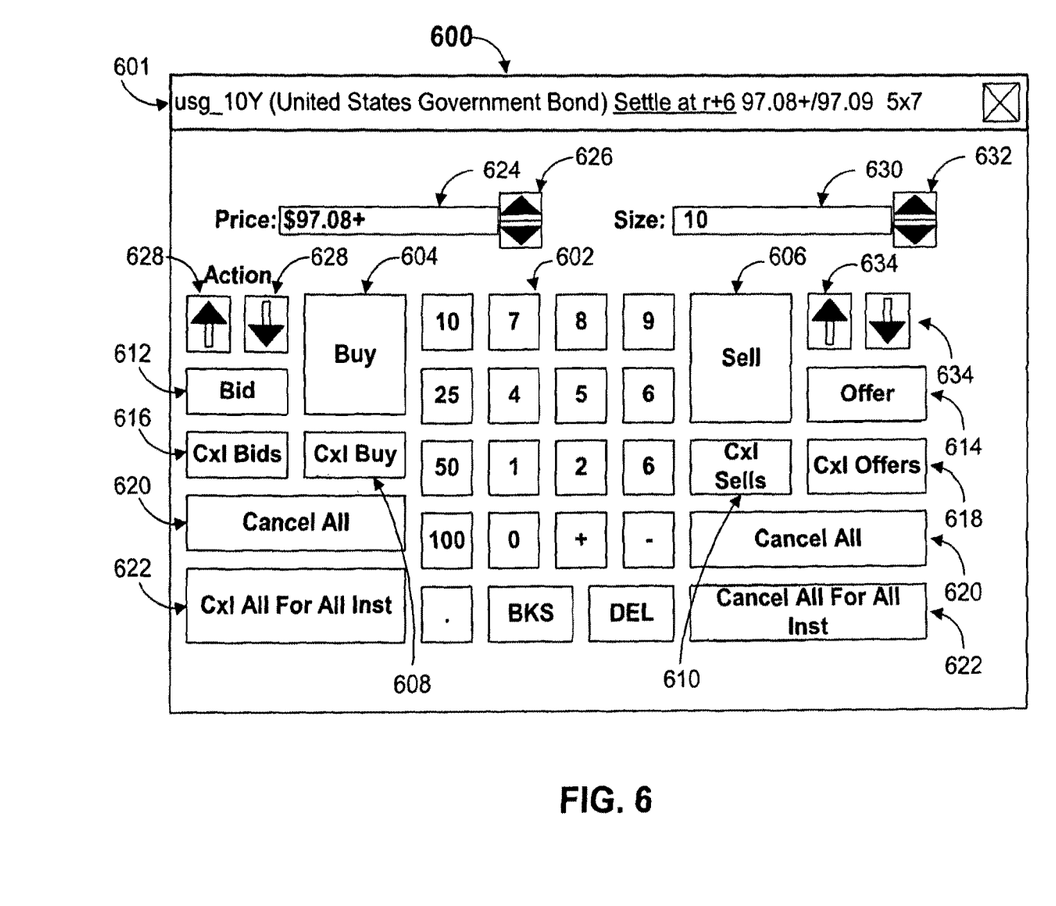
FIG. 6 is a graphical user interface relating to trading an instrument according to the invention.

FIG. 6 shows an interface 600 that may be provided in response to receive an input message such as a mouse click on one—e.g., settle at r+6—of the drop down menu 520 in FIG. 5. Interface 600 shown in FIG. 6 may be presented on a display of user computer 102 of FIG. 1.

In order to submit a bid or offer for the forward instrument indicated in display 601 using interface 600, an investor may first set a bid or offer price and a bid or offer size by entering the appropriate values in fields 624 and 630, respectively, using up/down buttons 626, 628, 632, and/or 634 and/or using keypad 602. Once the desired price and size for the bid or offer have been specified, the trader may then submit the bid or offer by pressing bid button 604 or the offer button 614.

In order to hit a bid or lift (or take) an offer for the instrument indicated in display 601 using interface 600, an investor may first specify a size in field 630 using up/down buttons 632 and/or 634 and/or using keypad 602. Once the desired size has been specified, the trader may then hit the bid or lift (or take) the offer for the specified size by pressing sell button 606 or buy button 604, respectively.

In the event that a trader desires to cancel a bid, an offer, a hit, or a lift (or take), the trader may press any corresponding one of buttons 608, 610, 616, 618, 620 and 622.

Thus, a graphical user interface for providing an investor with opportunities to take non-standard positions with respect to a financial instrument, especially an interest-rate related instrument, is provided.

What is claimed is:

1. A method for facilitating electronic trading over a communication network between interfaces of computing devices, the method comprising:
    displaying by at least one processor on a display device a graphical user interface of a computing device of a user, wherein the graphical user interface includes an order price for a first non-standard settlement position for a financial instrument and an order price for a second non-standard settlement position for the financial instrument,
        wherein the order price for the first non-standard settlement position is based at least in part on (i) a first cost of borrowing the financial instrument for a first duration of time and (ii) at least one market price for the financial instrument, and
        wherein the order price for the second non-standard settlement position is based at least in part on (i) a second cost of borrowing the financial instrument for a second duration of time and (ii) the at least one market price;
        wherein the graphical user interface comprises a first portion and a second portion;
        wherein the at least one market price is displayed in the first portion of the graphical user interface and the order price for the first non-standard settlement position and the order price for the second non-standard settlement position are displayed in the second portion of the graphical user interface,
        wherein the second portion of the graphical user interface of the computing device of the user is either hidden from a user or displayed to the user together with the first portion of the graphical user interface,
        wherein the graphical user interface of the computing device of the user further comprises a button that is selectable by the user,
        wherein when the second portion of the graphical user interface of the computing device is hidden from the user, a selection of the button by the user causes the second portion of the graphical user interface of the computing device to be displayed to the user on the display device, and
        wherein when the second portion of the graphical user interface of the computing device is displayed to the user, a selection of the button by the user causes the second portion of the graphical user interface of the computing device to be hidden from the user on the display device; and wherein the displayed at least one market price for the financial instrument, the displayed order price for the first non-standard settlement position, and the displayed order price for the second non-standard settlement position are selectable by a user to submit a respective trading order for the financial instrument, the first non-standard settlement position, and the second non-standard settlement position;
    detecting by the at least one processor a selection of the button of the interface of the computing device by the user;
    responsive to detecting the selection of the button by the user, displaying by the at least one processor the second portion of the graphical user interface of the computing device to the user on the display device;
    detecting by the at least one processor a selection by the user of the displayed order price for the first non-standard settlement position; and
    responsive to detecting the selection of the displayed order price for the first non-standard settlement position, displaying by the at least one processor on the display device a trading interface of the computing device to the user; and
    receiving by the at least one processor a request to trade the first non-standard settlement position as a result of the user interacting with the trading interface.

2. The method of claim 1, further comprising displaying on the display device in the graphical user interface information related to the financial instrument that reflects market conditions for the financial instrument.

3. The method of claim 1, wherein the financial instrument is an interest-rate related instrument.

4. An apparatus for facilitating electronic trading over a communication network between interfaces of computing devices, the apparatus comprising:
    at least one processor; and
    a memory electronically coupled to the at least one processor and having a program stored thereon that when executed by the at least one processor, directs the at least one processor to:
    display on a display device a graphical user interface of a computing device of a user, wherein the graphical user interface includes an order price for a first non-standard settlement position with respect to a financial instrument and an order price for a second non-standard settlement position with respect to the financial instrument,
        wherein the order price for the first non-standard settlement position is based at least in part on (i) a first cost of borrowing the financial instrument for a first duration of time and (ii) at least one market price for the financial instrument, and
        wherein the order price for the second non-standard settlement position is based at least in part on (i) a second cost of borrowing the financial instrument for a second duration of time and (ii) the at least one market price;

wherein the graphical user interface of the computing device comprises a first portion and a second portion;

wherein the at least one market price is displayed in the first portion of the graphical user interface and the order price for the first non-standard settlement position and the order price for the second non-standard settlement position are displayed in the second portion of the graphical user interface, wherein the second portion of the graphical user interface of the computing device is either hidden from a user or displayed to the user together with the first portion of the graphical user interface, wherein the graphical user interface of the computing device further comprises a button that is selectable by the user, wherein when the second portion of the graphical user interface of the computing device is hidden from the user, a selection of the button by the user causes the second portion of the graphical user interface of the computing device to be displayed to the user on the display device, and wherein when the second portion of the graphical user interface is displayed to the user, a selection of the button by the user causes the second portion of the graphical user interface to be hidden from the user on the display device; and wherein the displayed at least one market price for the financial instrument, the displayed order price for the first non-standard settlement position, and the displayed order price for the second non-standard settlement position are selectable by a user to submit a respective trading order for the financial instrument, the first non-standard settlement position, and the second non-standard settlement position;

detect a selection of the button of the computing device by the user;

responsive to detecting the selection of the button by the user, display the second portion of the graphical user interface to the user on the display device of the computing device;

detect a selection from the interface of the computing device by the user of the displayed order price for the first non-standard settlement position;

responsive to detecting the selection of the displayed order price for the first second non-standard settlement position, display on the display device a trading interface of the computing device to the user; and receive a request to trade the first non-standard settlement position as a result of the user interacting with the trading interface of the computing device.

5. The apparatus of claim 4, wherein the program, when executed by the at least one processor, further directs the at least one processor to:
display on the display device in the graphical user interface information related to the financial instrument that reflects market conditions for the financial instrument.

6. The apparatus of claim 4, wherein the financial instrument is an interest-rate related instrument.

7. The method of claim 1, wherein the at least one market price comprises a bid price for the financial instrument and/or an offer price for the financial instrument.

8. The method of claim 1, wherein the first cost and the second cost are obtained from a Repurchase desk, and wherein the at least one market price is obtained from a cash market.

9. The method of claim 1,
wherein the order price for the first non-standard settlement position comprises a bid price for the first standard settlement position or an offer price for the first standard settlement position; and
wherein the order price for the second standard settlement position comprises a bid price for the second forward position or an offer price for the second standard settlement position.

10. The apparatus of claim 4, wherein the at least one market price comprises a bid price for the financial instrument and/or an offer price for the financial instrument.

11. The apparatus of claim 4, wherein the first cost and the second cost are obtained from a Repurchase desk, and wherein the at least one market price is obtained from a cash market.

12. The apparatus of claim 4,
wherein the order price for the first non-standard settlement position comprises a bid price for the first non-standard settlement position or an offer price for the first standard settlement position; and
wherein the order price for the second non-standard settlement position comprises a bid price for the second non-standard settlement position or an offer price for the second standard settlement position.

* * * * *